(12) United States Patent
Li et al.

(10) Patent No.: US 11,378,197 B2
(45) Date of Patent: Jul. 5, 2022

(54) VALVE

(71) Applicant: ILLINOIS TOOL WORKS INC., Glenview, IL (US)

(72) Inventors: Jionghua Li, Shanghai (CN); Sheng Feng, Shanghai (CN); Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/176,973

(22) Filed: Feb. 16, 2021

(65) Prior Publication Data

US 2021/0254740 A1    Aug. 19, 2021

(30) Foreign Application Priority Data

Feb. 19, 2020   (CN) .......................... 202010103310.1

(51) Int. Cl.
| | |
|---|---|
| *F16K 27/04* | (2006.01) |
| *F16K 11/076* | (2006.01) |
| *F01P 7/14* | (2006.01) |
| F16K 27/06 | (2006.01) |
| F01P 7/16 | (2006.01) |
| F16K 11/087 | (2006.01) |
| F16K 41/02 | (2006.01) |

(52) U.S. Cl.
CPC .............. *F16K 27/042* (2013.01); *F01P 7/14* (2013.01); *F16K 11/076* (2013.01); *F01P 7/16* (2013.01); *F01P 2007/146* (2013.01); *F16K 11/0873* (2013.01); *F16K 27/065* (2013.01); *F16K 27/067* (2013.01); *F16K 41/026* (2013.01)

(58) Field of Classification Search
CPC .. F16K 27/042; F16K 11/076; F16K 11/0873; F16K 27/065; F16K 27/067; F16K 41/026; F01P 7/14; F01P 2007/146; F01P 7/16

See application file for complete search history.

(56) References Cited

U.S. PATENT DOCUMENTS

| | | | | |
|---|---|---|---|---|
| 5,443,722 A | * | 8/1995 | Desai ..................... | B01D 35/12 137/625.21 |
| 6,197,195 B1 | * | 3/2001 | Booth .................... | B01D 29/96 137/630.17 |

(Continued)

*Primary Examiner* — Matthew W Jellett
*Assistant Examiner* — Christopher D Ballman
(74) *Attorney, Agent, or Firm* — Quarles & Brady LLP

(57) ABSTRACT

A valve comprising housing body, partition plate, and collecting device. The housing body defines a housing cavity. The partition plate is provided in the housing cavity. A leakage passage extends along the partition plate through the housing body. The collecting device comprises a lower piece, an upper piece, and a connector connecting them. The upper piece and the lower piece cover a leakage passage upper port and a leakage passage lower port, respectively. The lower piece comprises a collecting cavity communicating with the leakage passage lower port. The lower piece and lower part of the housing body are provided with lower fitting assembly. The upper piece and upper part of the housing body are provided with an upper fitting assembly. The lower piece and the upper piece are fitted on the housing body in place by means of the lower fitting assembly, the upper fitting assembly and the connector.

10 Claims, 12 Drawing Sheets

(56) References Cited

U.S. PATENT DOCUMENTS

| | | | | |
|---|---|---|---|---|
| 6,994,316 B2* | 2/2006 | Pervaiz | ............... | F16K 11/085 |
| | | | | 251/175 |
| 7,089,960 B2* | 8/2006 | Maruta | ............... | F16K 5/0605 |
| | | | | 137/625.22 |
| 7,111,643 B2* | 9/2006 | Oh | ............... | F16K 5/12 |
| | | | | 251/118 |
| 7,347,408 B2* | 3/2008 | Keiser | ............... | F16K 27/067 |
| | | | | 251/315.08 |
| 7,694,693 B1* | 4/2010 | Edelman | ............... | A61F 7/02 |
| | | | | 137/625.3 |
| 8,961,792 B2* | 2/2015 | Desai | ............... | B01D 35/12 |
| | | | | 210/418 |
| 9,382,833 B2* | 7/2016 | Morein | ............... | F16K 11/165 |
| 9,500,299 B2* | 11/2016 | Morein | ............... | F16K 11/0876 |
| 9,617,906 B2* | 4/2017 | Lee | ............... | F01P 7/14 |
| 9,670,825 B2* | 6/2017 | Murakami | ............... | F16K 11/085 |
| 9,695,734 B2* | 7/2017 | Carns | ............... | F16K 5/0605 |
| 9,803,764 B2* | 10/2017 | Chang | ............... | F16K 31/524 |
| 9,945,283 B2* | 4/2018 | Muizelaar | ............... | F16K 31/042 |
| 10,094,268 B1* | 10/2018 | Russalian | ............... | F16K 5/08 |
| 10,280,829 B2* | 5/2019 | Shen | ............... | F16K 27/067 |
| 10,428,721 B2* | 10/2019 | Murakami | ............... | G05D 23/19 |
| 10,458,562 B2* | 10/2019 | Ozeki | ............... | F16K 31/041 |
| 10,591,069 B2* | 3/2020 | Russalian | ............... | F16K 5/201 |
| 10,648,395 B2* | 5/2020 | Nomura | ............... | F01P 7/165 |
| 10,808,863 B2* | 10/2020 | Bugeja | ............... | F16K 11/165 |
| 10,975,975 B2* | 4/2021 | Sato | ............... | F16K 31/535 |
| 11,022,023 B2* | 6/2021 | Yi | ............... | F16K 3/24 |
| 2007/0039653 A1* | 2/2007 | Maggard | ............... | F16K 11/22 |
| | | | | 137/625.19 |
| 2010/0282190 A1* | 11/2010 | Stoermer | ............... | F16K 11/10 |
| | | | | 123/41.08 |
| 2015/0361865 A1* | 12/2015 | Lee | ............... | F01P 7/14 |
| | | | | 123/41.08 |
| 2016/0003125 A1* | 1/2016 | Lee | ............... | F16K 11/0873 |
| | | | | 123/41.08 |
| 2016/0040585 A1* | 2/2016 | Schaefer | ............... | F16K 11/202 |
| | | | | 137/594 |
| 2016/0109031 A1* | 4/2016 | Greene | ............... | F16K 11/085 |
| | | | | 251/314 |
| 2017/0009894 A1* | 1/2017 | Seko | ............... | F16K 31/041 |
| 2017/0321595 A1* | 11/2017 | Jang | ............... | F01P 7/16 |
| 2018/0119838 A1* | 5/2018 | Brazas | ............... | F16K 31/535 |
| 2019/0017612 A1* | 1/2019 | Ikemoto | ............... | F01P 3/02 |
| 2020/0318751 A1* | 10/2020 | Tanaka | ............... | F16K 37/0041 |

* cited by examiner

VALVE

CROSS REFERENCE TO RELATED APPLICATIONS

This application is based on, claims priority to, and incorporates herein by reference in its entirety Chinese Patent Application No. 202010103310.1, filed on Feb. 19, 2020, and entitled "Valve".

TECHNICAL FIELD

The present disclosure relates to the field of valves, and in particular to a valve for an internal combustion engine.

BACKGROUND

A valve is usually used in an internal combustion engine to form, in the internal combustion engine, different cooling circuits between different components to be cooled. Specifically, the valve comprises a housing, a shaft, and a valve body. The housing defines a housing cavity, and has at least three ports. The at least three ports are used to be connected to different components to be cooled in the internal combustion engine, so as to form different cooling circuits. A partition plate is provided in the housing, and the partition plate divides the housing cavity into a left cavity and a right cavity. The partition plate is provided with a hole used for accommodating the shaft. The driving component is connected to the valve body via the shaft, such that the driving component can drive the valve body to rotate. The valve body is provided with at least one hole, such that the valve body, when it is rotating, can be selectively in communication with one or several ports of the housing, so as to form different cooling circuits.

SUMMARY OF THE DISCLOSURE

Exemplary embodiments of the present disclosure may solve at least some of the above problems. For example, the present application provides a valve comprising a housing body, a partition plate and a collecting device. The housing body defines a housing cavity, which extends transversely through the housing body. The partition plate is provided in the housing cavity to divide the housing cavity into a left cavity and a right cavity. A leakage passage is provided in and extends along the partition plate through the housing body, with a leakage passage lower port and a leakage passage upper port formed on the housing body. The collecting device comprises a lower piece, an upper piece and a connector connecting the lower piece and the upper piece. The upper piece is configured to cover the leakage passage upper port, and the lower piece is configured to cover the leakage passage lower port and comprises a collecting cavity communicating with the leakage passage lower port. The lower piece and a lower part of the housing body are provided with a lower fitting assembly. The upper piece and an upper part of the housing body are provided with an upper fitting assembly, and the lower piece and the upper piece are respectively fitted on the housing body in place by means of the lower fitting assembly, the upper fitting assembly and the connector.

According to the valve of the application, the lower fitting assembly comprises the housing lower fitting part provided on the housing body and a lower piece fitting part provided on the lower piece. The upper fitting assembly comprises the housing upper fitting part provided on the housing body and an upper piece fitting part provided on the upper piece.

According to the valve of the application, a housing lower fitting part and a housing upper fitting part are disposed symmetrically with respect to an axis of the housing body.

According to the valve of the application, the housing lower fitting part and the housing upper fitting part protrude out of an outer surface of the housing body. The lower piece fitting part is a recess in the lower piece and the upper piece fitting part is a recess in the upper piece.

According to the valve of the application, the housing lower fitting part and the housing upper fitting part are respectively wedge-shaped. The wedge-shaped housing lower fitting part comprises a first blocking surface and a first inclined surface connected with the first blocking surface. The first inclined surface is closer to the connector than the first blocking surface. The wedge-shaped housing lower fitting part comprises a second blocking surface and a second inclined surface connected with the second blocking surface. The second inclined surface is closer to the connector than the second blocking surface.

According to the valve of the application, the housing further comprises a left limiter and a right limiter. The left limiter and the right limiter respectively protrude out of the outer surface of the housing body, so that a connector receiving part is formed between the left limiter and the right limiter to receive the connector.

According to the valve of the application, the collecting device is made in one piece from plastic.

According to the valve of the application, the partition plate is provided with a shaft accommodating hole transversely penetrating through the partition plate and used for accommodating a shaft. The shaft accommodating hole is in communication with the leakage passage.

According to the valve of the application, the left cavity is used for accommodating a driving component, and the right cavity is used for accommodating a valve body of the valve. In some embodiments, the left cavity is used for arranging a driving component, and the right cavity is used for accommodating the valve body that controls the direction of flow of a cooling liquid.

According to the valve of the application, the housing body further comprises a left sealing plate and a right sealing plate. The left sealing plate and the right sealing plate are connected with left and right surfaces of the partition plate around the shaft accommodating hole, respectively. The valve further comprises a shaft, a first seal and a second seal. The shaft is disposed through the shaft accommodating hole. The first seal is annular. An inner wall of the first seal abuts against the shaft and an outer wall of the first seal abuts against the left sealing plate such that a left cavity and the leakage passage are sealed from each other by the first seal. The second seal is annular. An inner wall of the second seal abuts against the shaft and an outer wall of the second seal abuts against the right sealing plate such that the leakage passage and right cavity are sealed from each other by the second seal. In some embodiments, the valve further comprises a seal, which is disposed between the shaft and the partition plate to prevent the cooling liquid accommodated in the right cavity from entering the driving component along the shaft, so as to prevent short circuit, corrosion, wear, etc. of the driving component due to erosion by the cooling liquid.

A cooling liquid leaking in a valve provided in the present disclosure can be collected by a collecting device without dripping out of the valve. The collecting device provided in the present disclosure can be made by means of molding, is simple and easy to manufacture, and can save the manufacturing time. The collecting device is mounted to the housing by means of the collecting device itself and the structure on the housing without other fastening components (such as nuts and bolts), which can reduce the number of fitting components and save on costs.

Other features, advantages and embodiments of the present disclosure may be elaborated or become apparent by considering the following specific embodiments, accompanying drawings and claims. Furthermore, it should be appreciated that the above summary and the following specific embodiments are all exemplary, and are intended to provide a further explanation, but not to limit the scope of protection of the present disclosure. However, the specific embodiments and specific examples merely indicate preferred embodiments of the present disclosure. For those skilled in the art, various variations and modifications within the spirit and scope of the present disclosure will become apparent by reading the specific embodiments.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Various specific embodiments of the present disclosure are described below with reference to the accompanying drawings which constitute part of this description. It should be understood that although the terms, such as "upper", "down", "left", "right", "inner" and "outer", indicating orientations are used in the present disclosure to describe various exemplary structural portions and elements in the present disclosure, these terms are merely used herein for the purpose of easy illustration, and are determined based on the exemplary orientations as shown in the accompanying drawings. Since the embodiments disclosed in the present disclosure can be disposed in different directions, these terms indicating directions are only illustrative and should not be considered as limitations.

Figure 1A:
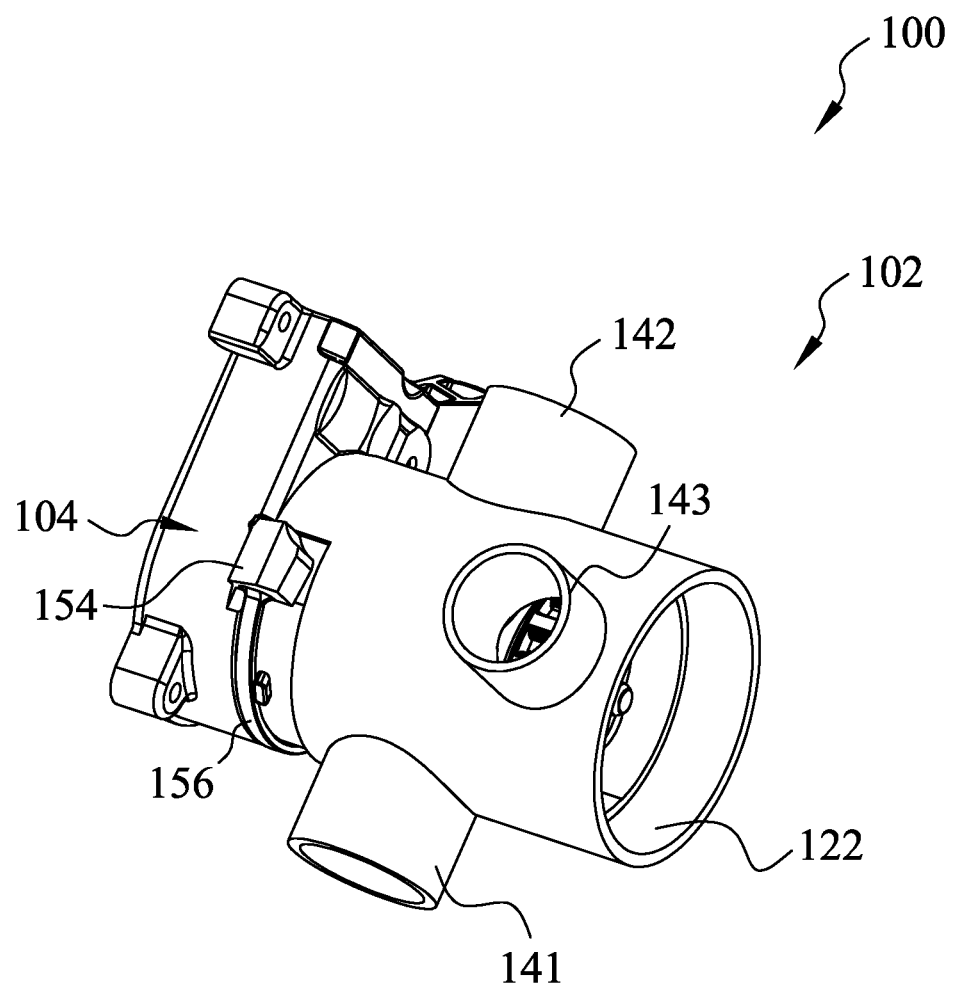
FIG. 1A is a perspective view of a valve according to an embodiment of the present disclosure, as viewed from top to bottom.
Figure 1B:
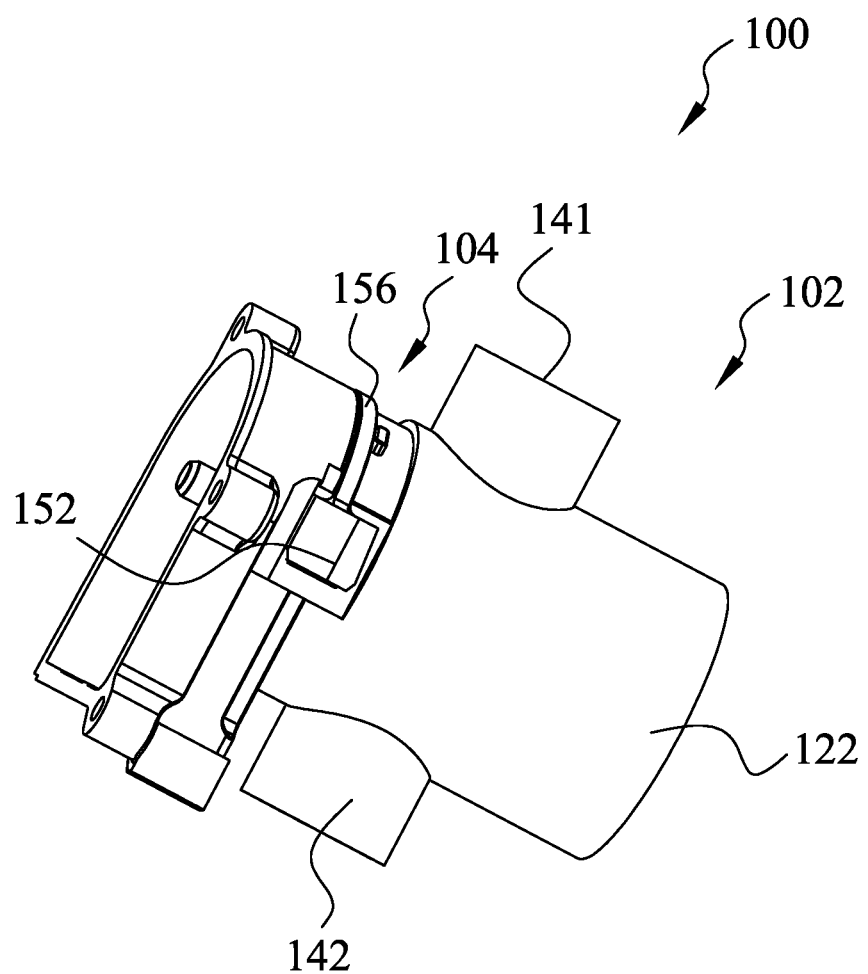
FIG. 1B is a perspective view of the valve shown in FIG. 1A, as viewed from bottom to top.
Figure 1C:
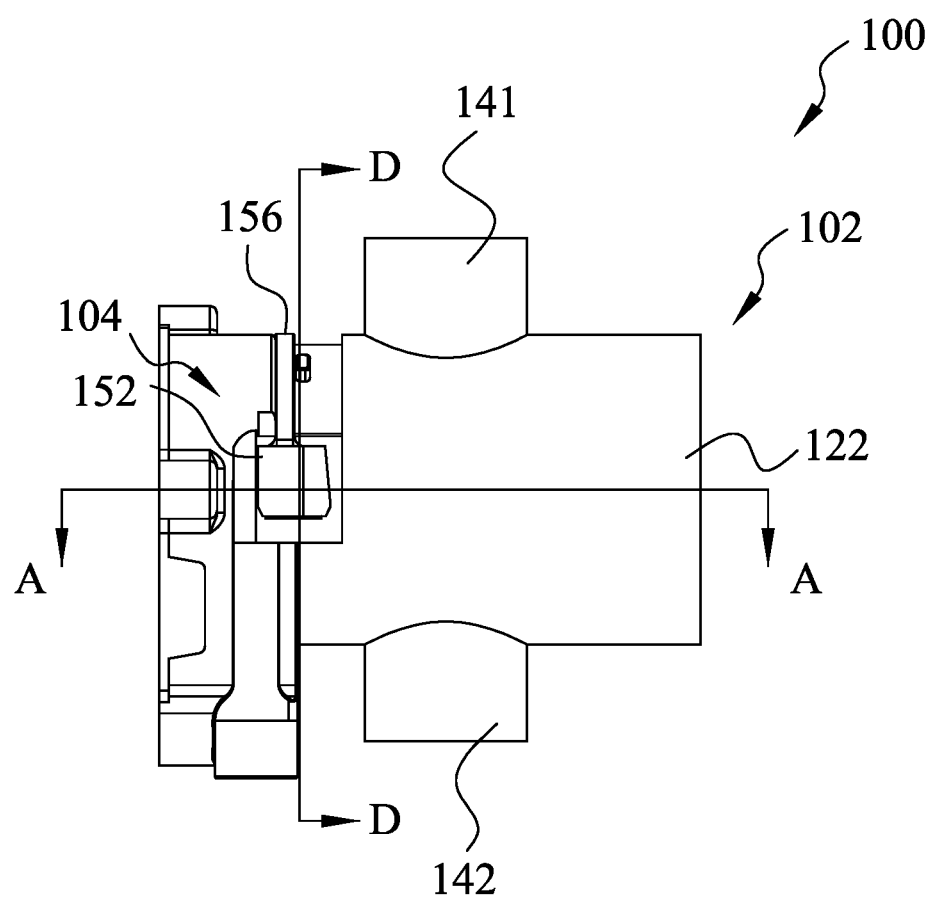
FIG. 1C is a bottom view of the valve shown in FIG. 1A.
Figure 1D:
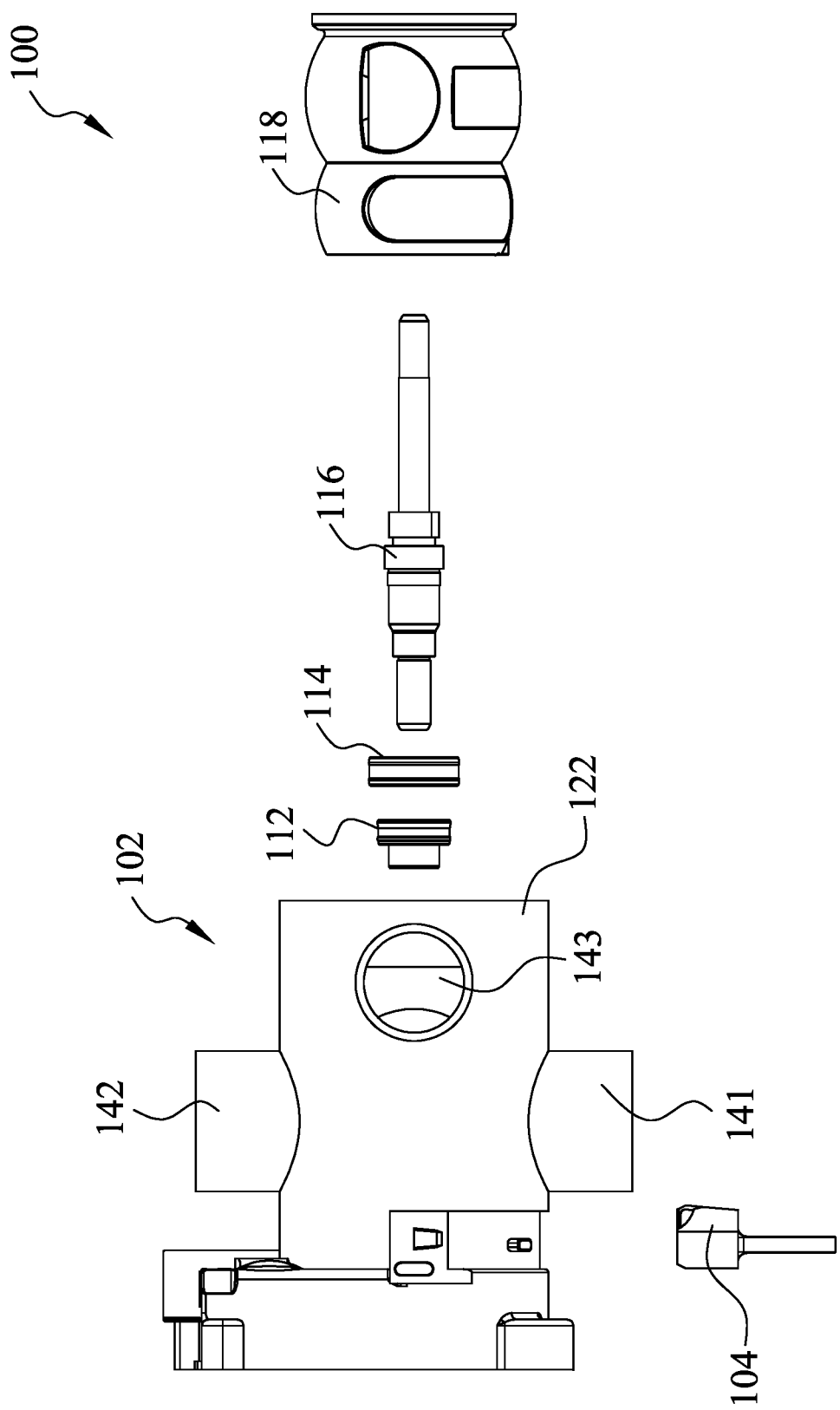
FIG. 1D is an exploded view of the valve shown in FIG. 1A.

FIG. 1A is a perspective view of a valve 100 according to an embodiment of the present disclosure as viewed from top to bottom. FIG. 1B is a perspective view of the valve 100 shown in FIG. 1A as viewed from bottom to top. FIG. 1C is a bottom view of the valve 100 shown in FIG. 1A. FIG. 1D is an exploded view of the valve 100 shown in FIG. 1A. As shown in FIGS. 1A-1D, the valve 100 comprises a housing 102, a shaft 116, a valve body 118, a first seal 112, and a second seal 114. The shaft 116, the valve body 118, the first seal 112 and the second seal 114 are disposed in the housing 102. The positional relationship between the shaft 116, the valve body 118, the first seal 112 and the second seal 114 in the housing 102 will be described in detail with reference to FIG. 2.

The housing 102 comprises a housing body 122, a first tube 141, a second tube 142, and a third tube 143. Specifically, the housing body 122 is substantially a hollow cylinder. The housing body 122 defines a housing cavity. The housing cavity transversely penetrates through the housing body 122. The first tube 141, the second tube 142 and the third tube 143 are disposed outside the housing body 122, and are all hollow tubes. The first tube 141, the second tube 142 and the third tube 143 can be in fluid communication with the housing cavity such that a fluid (such as a cooling liquid) accommodated in the housing cavity can flow out of the housing 102 through the first tube 141, the second tube 142 and the third tube 143, or the fluid (such as the cooling liquid) can flow into the housing 102 through the first tube 141, the second tube 142 and the third tube 143. The first tube 141, the second tube 142 and the third tube 143 can be communicated with components to be cooled (not shown) so as to form different cooling circuits to cool different components to be cooled.

Figure 2:
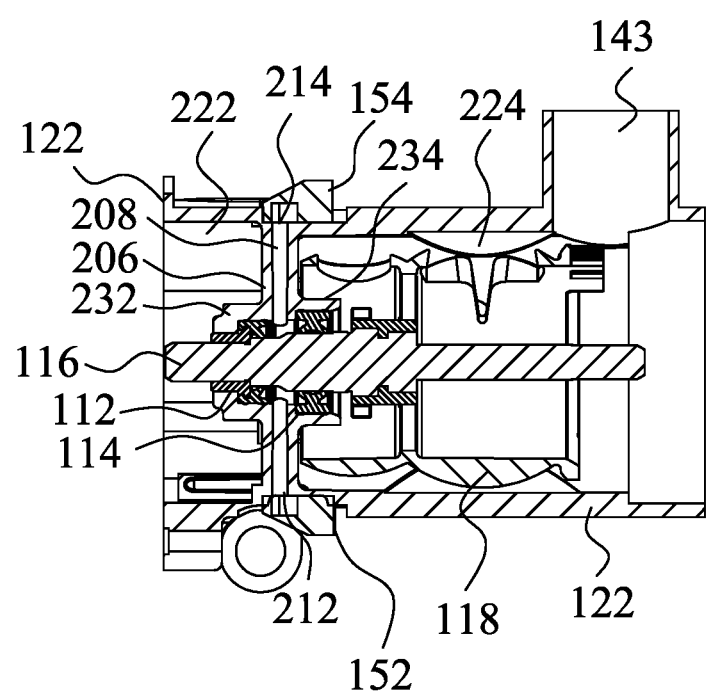
FIG. 2 is a cross-sectional view of the valve shown in FIG. 1A along line A-A in FIG. 1C.

FIG. 2 is a cross-sectional view of the valve 100 shown in FIG. 1A along line A-A in FIG. 1C to show the specific positional relationship between the shaft 116, the valve body 118, the first seal 112 and the second seal 114 in the housing 102. As shown in FIG. 2, the housing 102 further comprises a partition plate 206. The partition plate 206 is disposed in the housing cavity and divides the housing cavity into a left cavity 222 and a right cavity 224. The left cavity 222 is used for accommodating a driving component (not shown). The right cavity 224 is used for accommodating the valve body 118 that controls the direction of flow of the cooling liquid.

A leakage passage 208 is provided in the partition plate 206. The leakage passage 208 extends along the partition plate 206 and penetrates through the housing body 122, with a leakage passage lower port 212 and a leakage passage upper port 214 formed on the housing body 122. The partition plate 206 is further provided with a shaft accommodating hole penetrating through the partition plate 206 and used for accommodating the shaft 116. The shaft accommodating hole is in fluid communication with the leakage passage 208. As an example, the partition plate 206 is vertically disposed in the housing cavity, the leakage passage 208 vertically penetrates through the partition plate 206, and the shaft accommodating hole transversely penetrates through the partition plate 206.

The housing 102 further comprises a left sealing plate 232 and a right sealing plate 234. The left sealing plate 232 is disposed around the shaft accommodating hole, and is connected to a left surface (i.e., a left side) of the partition plate 206. The right sealing plate 234 is also disposed around the shaft accommodating hole, and is connected to a right surface (i.e., a right side) of the partition plate 206.

The shaft 116 of the valve 100 is substantially cylindrical, and can rotate around its own axis. The shaft 116 can penetrate through the shaft accommodating hole, and is transversely disposed in the housing cavity. A left end of the shaft 116 enters the left cavity 222 and is then connected to a driving component (not shown) located in the left cavity 222. A right end of the shaft 116 enters the right cavity 224 and is then connected to the valve body 118 located in the right cavity 224. When the driving component drives the shaft 116 to rotate, the shaft 116 can rotate around the axis along with the valve body 118.

Both the first seal 112 and the second seal 114 of the valve 100 are annular. An outer wall of the first seal 112 abuts against the left sealing plate 232, and an inner wall of the first seal 112 abuts against the shaft 116, such that the first seal 112 can form a seal between the left cavity 222 and the leakage passage 208. An outer wall of the second seal 114 abuts against the right sealing plate 234, and an inner wall of the second seal 114 abuts against the shaft 116, such that the second seal 114 can form a seal between the leakage passage 208 and the right cavity 224.

The valve body 118 of the valve 100 is hollow, and the valve body 118 is provided with three openings (see FIG. 1D). When at least one of the three openings on the valve body 118 is aligned with at least one of the first tube 141, the second tube 142, and the third tube 143 on the housing 102, the cooling liquid in the right cavity 224 can flow in or out of the valve 100 through the first tube 141, the second tube 142 and/or the third tube 143 aligned with the opening on the valve body 118.

It should be noted that the present disclosure is not intended to limit the mounting sequence and connection relationship between the shaft 116, the valve body 118, the first seal 112 and the second seal 114, and any mounting sequence and connection relationship are within the scope of protection of the present disclosure.

In addition, further with reference to FIGS. 1A-1D, the valve 100 further comprises a collecting device 104. The collecting device 104 is mounted on an outer side of the housing 102. The collecting device 104 comprises a lower piece 152, an upper piece 154 and a connector 156. The connector 156 is used for connecting the lower piece 152 and the upper piece 154. The lower piece 152 is used for covering the leakage passage lower port 212 of the leakage passage 208. The upper piece 154 is used for covering the leakage passage upper port 214 of the leakage passage 208.

In a conventional valve, the cooling liquid accommodated in the right cavity may enter the left cavity along the shaft, causing the cooling liquid to come into contact with a driving component in the left cavity, resulting in short circuit, corrosion, wear, etc. of the driving component. in contrast, in the valve 100 of the present disclosure, the leakage passage 208 is provided in the housing 102, such that when the cooling liquid accommodated in the right cavity 224 flows toward the left cavity 222 along the shaft 116, the cooling liquid can flow out of the housing cavity through the leakage passage 208, so as to prevent the cooling liquid from entering the left cavity 222. In addition, the collecting device 104 in the valve 100 of the present disclosure can cover the leakage passage lower port 212 for collecting the cooling liquid that flows out of the leakage passage lower port 212 of the leakage passage 208, so as to prevent the cooling liquid from coming into contact with other components disposed outside the valve 100 (such as a component to be cooled).

Figure 3A:
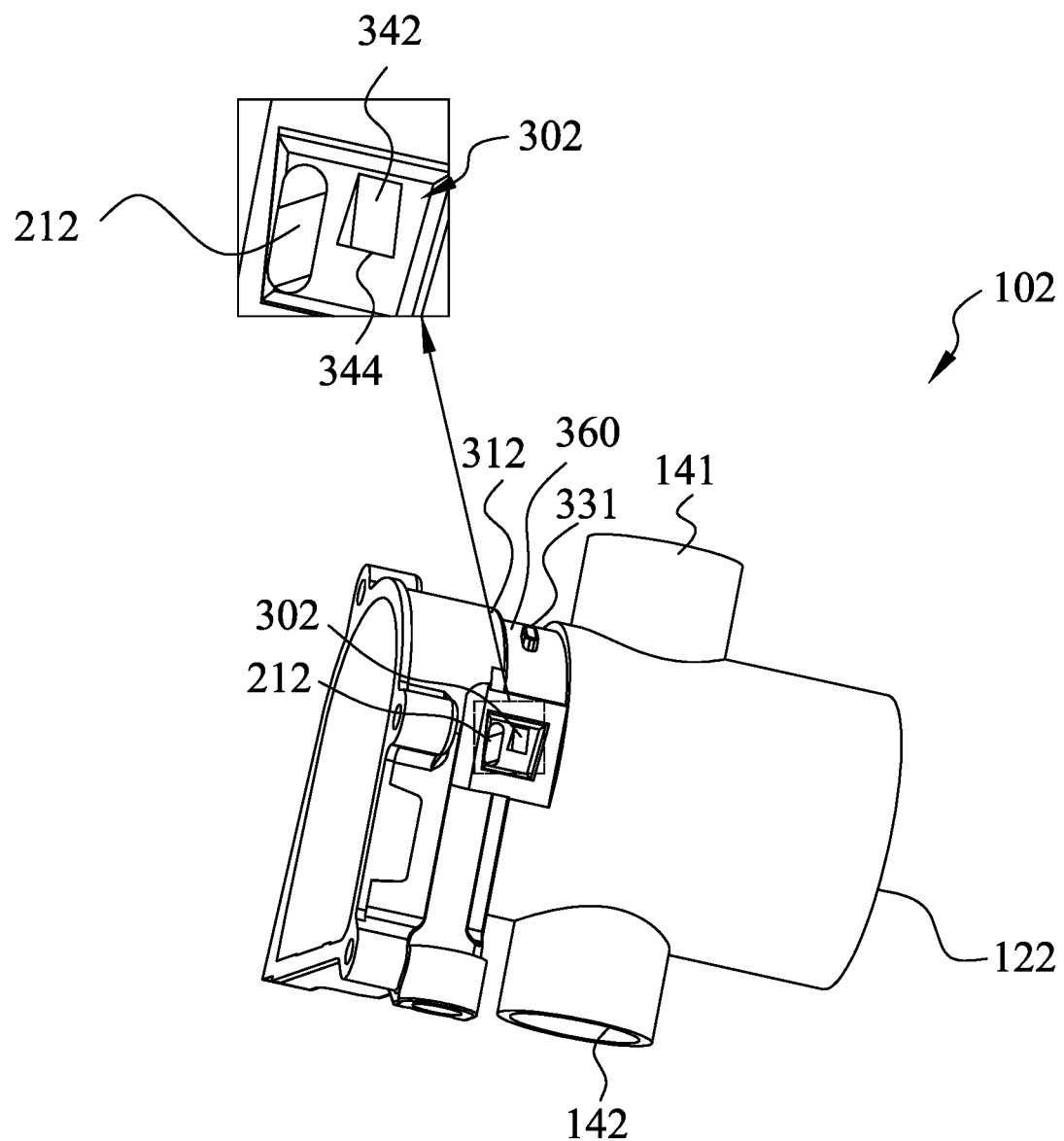
FIG. 3A is a perspective view of a housing shown in FIG. 1A, as viewed from bottom to top.
Figure 3B:
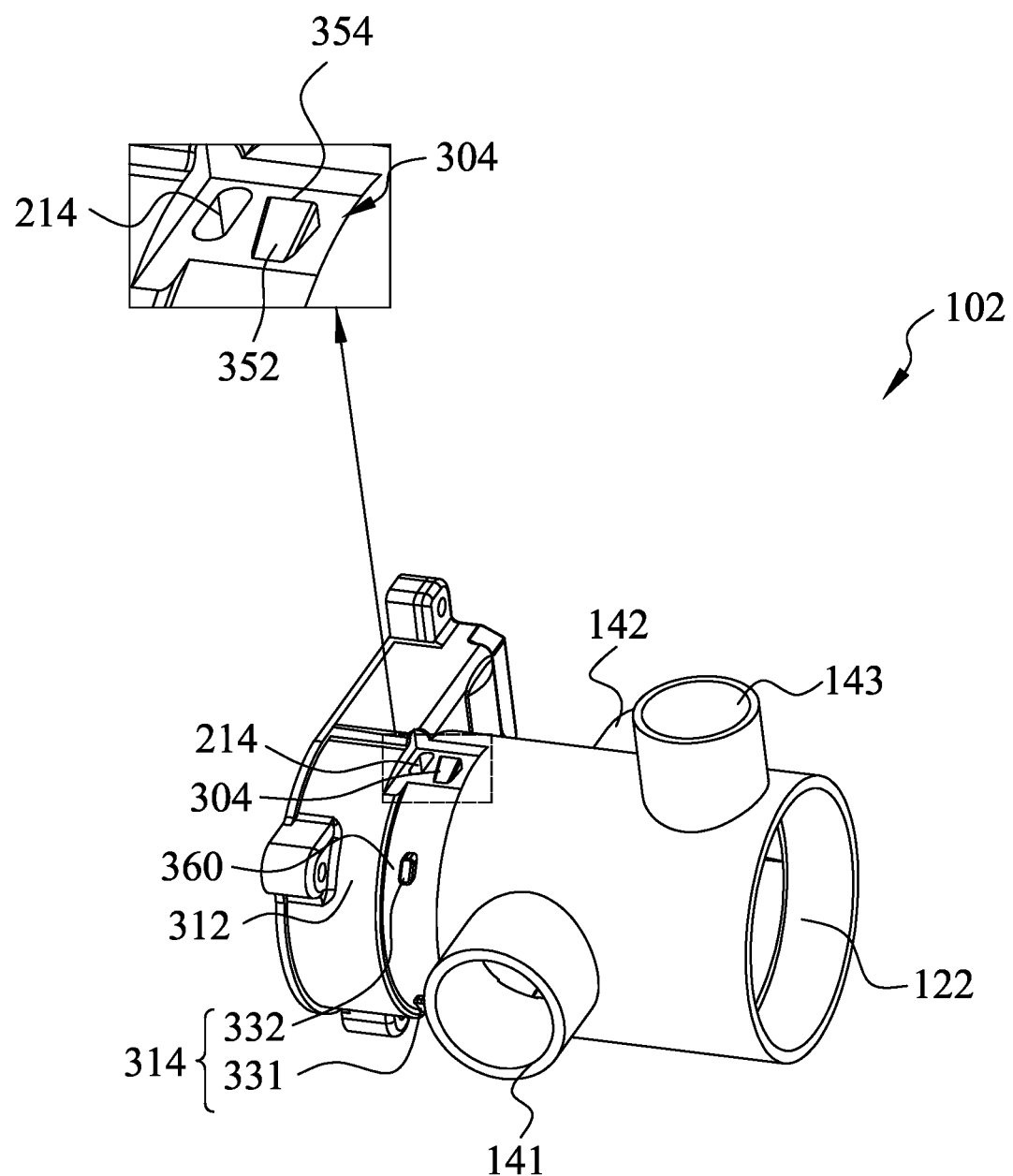
FIG. 3B is a perspective view of the housing shown in FIG. 1A, as viewed from top to bottom.
Figure 3C:
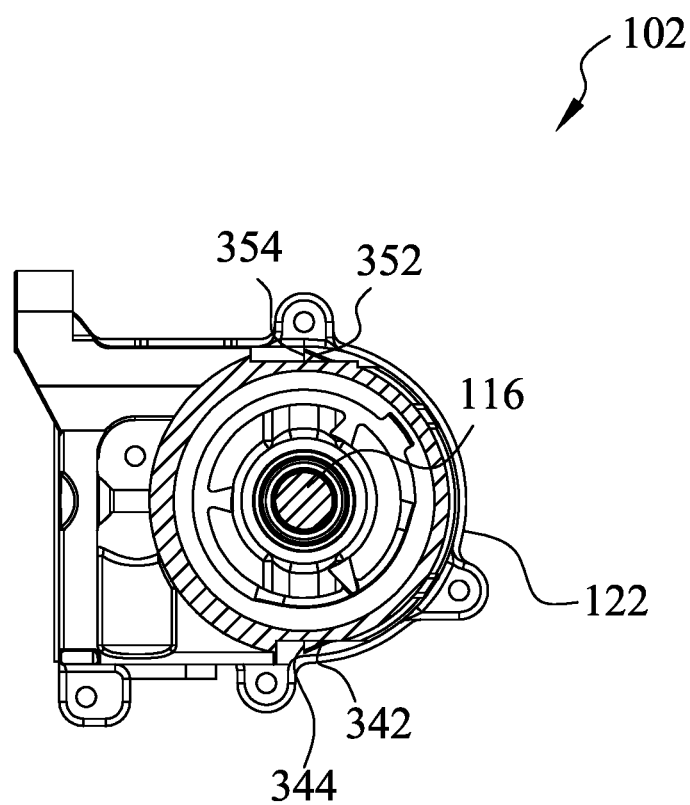
FIG. 3C is a cross-sectional view of the housing shown in FIG. 1A along line D-D in FIG. 1C.

FIG. 3A is a perspective view of a housing 102 shown in FIG. 1A as viewed from bottom to top. FIG. 3B is a perspective view of the housing 102 shown in FIG. 1A as viewed from top to bottom. FIG. 3C is a cross-sectional view of the housing 102 shown in FIG. 1A along line D-D in FIG. 1C to show a structure of the housing 102 that matches the collecting device 104. As shown in FIGS. 3A-3C, the housing 102 comprises a left limiter 312 and a right limiter 314 to restrict the connector 156 of the collecting device 104 from moving left and right. Specifically, the left limiter 312 is disposed on the housing body 122, and is disposed protruding out of an outer surface of the housing body 122. The left limiter 312 extends in a circumferential direction of the housing body 122. The left limiter 312 is substantially disposed in the same circumferential direction of the housing body 122 as the leakage passage lower port 212 and the leakage passage upper port 214. The right limiter 314 comprises a protruding part 331 and a protruding part 332 which are disposed in the same circumferential direction of the housing body 122. The protruding part 331 and the protruding part 332 also protrude out of the outer surface of the housing body 122. The left limiter 312 and the right limiter 314 are separated by a certain distance in a lengthwise direction of the housing body 122 (i.e., an axial direction of the housing body 122) to define a connector receiving part 360 between the left limiter 312 and the right limiter 314 to receive the connector 156 in the collecting device 104.

It should be noted that although in the present disclosure the right limiter 314 comprises the two protruding parts, those skilled in the present disclosure could have understood that the right limiter 314 can comprise any other number of protruding parts. In addition, although in the present disclosure the left limiter 312 is a structure extending in the circumferential direction of the housing body 122 and protruding out of the housing body 122, those skilled in the present disclosure could have understood that the left limiter 312 can also be formed by at least two protruding parts.

It should also be noted that although in the present disclosure the connector receiving part 360 is defined by the left limiter 312 and the right limiter 314 which protrude out of the housing body 122, those skilled in the present disclosure could have understood that the connector receiving part 360 can also be formed by recessing inwardly from the housing body 122.

Further with reference to FIGS. 3A and 3C, the housing 102 further comprises a housing lower fitting part 302, which is used for matching the lower piece 152 of the collecting device 104, such that the lower piece 152 is mounted to the housing 102. The housing lower fitting part 302 is disposed on an outer side of the housing body 122, and protrudes out of the outer surface of the housing body 122. The housing lower fitting part 302 is substantially located on a right side of the leakage passage lower port 212. Specifically, the housing lower fitting part 302 is wedge-shaped. The wedge-shaped housing lower fitting part 302 comprises a first blocking surface 344 perpendicular to the outer surface of the housing body 122, and a first inclined surface 342. The first blocking surface 344 is formed by substantially extending outward along a radial direction of the housing body 122. The first inclined surface 342 is connected to the first blocking surface 344, and the first inclined surface 342 is closer to the connector receiving part 360 than the first blocking surface 344. In other words, when the collecting device 104 is mounted on the housing 102, the first inclined surface 342 is closer to the connector 156 than the first blocking surface 344. The cross section of the housing lower fitting part 302 in the radial direction of the housing body 122 is substantially triangular (see FIG. 3C).

Further with reference to FIGS. 3B and 3C, the housing 102 further comprises a housing upper fitting part 304, which is used for matching the upper piece 154 of the collecting device 104, such that the upper piece 154 is mounted to the housing 102. The housing upper fitting part 304 and the housing lower fitting part 302 are symmetrically disposed with respect to a lengthwise direction of the housing body 122 (i.e., the axis of the housing body 122). Specifically, the housing upper fitting part 304 is disposed on an outer side of the housing body 122, and protrudes out of the outer surface of the housing body 122. The housing upper fitting part 304 is substantially located on a right side of the leakage passage upper port 214. The housing upper fitting part 304 is wedge-shaped. The wedge-shaped housing upper fitting part 304 comprises a second blocking surface 354 perpendicular to the outer surface of the housing body 122 and a second inclined surface 352. The second blocking surface 354 is formed by substantially extending outward along a radial direction of the housing body 122. The second inclined surface 352 is connected to the second blocking surface 354, and the second inclined surface 352 is closer to the connector receiving part 360 than the second blocking surface 354. In other words, when the collecting device 104 is mounted on the housing 102, the second inclined surface 352 is closer to the connector 156 than the second blocking surface 354. The housing upper fitting part 304 in the radial cross section of the housing body 122 is substantially triangular (see FIG. 3C).

Although in the present disclosure the first blocking surface 344 and the second blocking surface 354 are not disposed perpendicular to the outer surface of the housing body 122, those skilled in the art could have understood that, instead of being disposed in the radial direction of the housing body 122, the first blocking surface 344 and the second blocking surface 354 may be inclined with respect to the radial direction of the housing body 122, as long as they can prevent the collecting device 104, which is fitted in place, from being escaped from the housing 102.

Although in the present disclosure both the housing upper fitting part 304 and the housing lower fitting part 302 are wedge-shaped, those skilled in the art could have understood that the housing upper fitting part 304 and the housing lower fitting part 302, whose shape make them protrude out of the housing body 122, fall within the scope of protection of the present disclosure.

Figure 4:
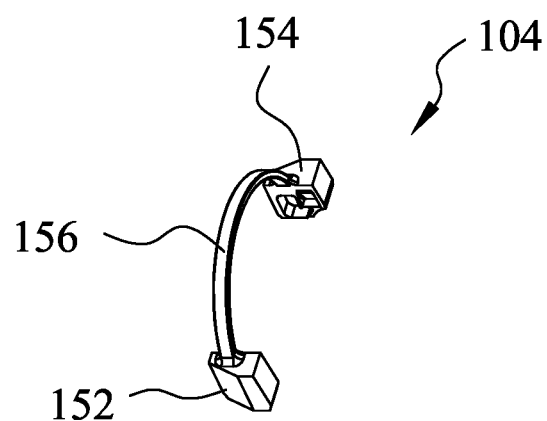
FIG. 4 is a perspective view of a collecting device shown in FIG. 1.

FIG. 4 is a perspective view of the collecting device 104 shown in FIG. 1. As shown in FIG. 4, the collecting device 104 comprises a lower piece 152, an upper piece 154 and a connector 156. The connector 156 is substantially an arc-shaped strip. One end of the connector 156 is connected to the lower piece 152, and the other end of the connector 156 is connected to the upper piece 154, such that the lower piece 152 and the upper piece 154 are connected together. The lower piece 152 can fit with the housing lower fitting part 302 of the housing 102, the upper piece 154 can fit with the housing upper fitting part 304 of the housing 102, and the connector 156 can be received by the connector receiving part 360, such that the collecting device 104 is mounted on the housing 102. As an example, the collecting device 104 of the present disclosure is made in one piece from plastic. As another example, the lower piece 152, the upper piece 154 and the connector 156 in the collecting device 104 of the present disclosure may also be connected to each other by means of connecting components. The collecting device 104 of the present disclosure is configured such that when external force is applied to the lower piece 152 and/or the upper piece 154, the collecting device 104 can deform, such that the lower piece 152 and the upper piece 154 move away from each other. In addition, the collecting device 104 is further configured such that when the external force is removed, the deformation caused by the external force disappears and the collecting device 104 restores to its original shape.

Figure 5A:
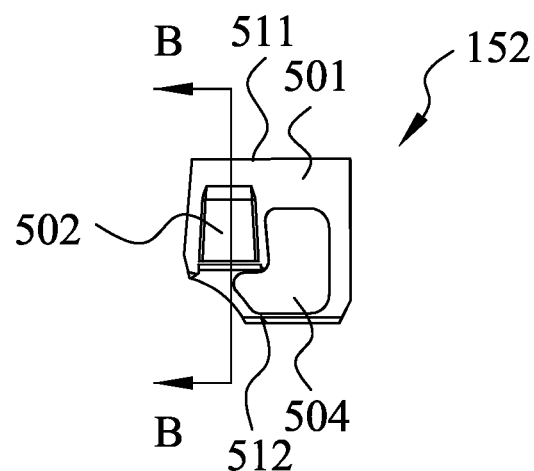
FIG. 5A is a side view of a lower piece shown in FIG. 4, as viewed from the inside to the outside.
Figure 5B:
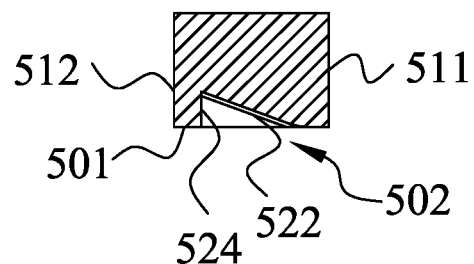
FIG. 5B is a cross-sectional view of the lower piece shown in FIG. 5A along line B-B in FIG. 5A.

FIG. 5A is a side view of the lower piece 152 shown in FIG. 4 as viewed from the inside to the outside. FIG. 5B is a cross-sectional view of the lower piece 152 shown in FIG. 5A along line B-B in FIG. 5A. As shown FIGS. 5A-5B, the lower piece 152 is substantially a block with a certain thickness. One end 511 thereof is connected to one end of the connector 156, and the other end thereof is a free end 512. The lower piece 152 is provided with a lower piece fitting part 502. The lower piece fitting part 502 is a recess on the lower piece 152. In other words, the lower piece fitting part 502 is formed by recessing inward from an inner surface 501 of the lower piece 152. The lower piece fitting part 502 is wedge-shaped. That is, the cross section of the lower piece fitting part 502 in a lengthwise direction of the connector 156 (i.e., the cross section along line B-B of FIG. 5A) is triangular, and can match the housing lower fitting part 302. More specifically, the lower piece fitting part 502 has a lower piece blocking surface 524 and a lower piece inclined surface 522. The lower piece blocking surface 524 is substantially perpendicular to the inner surface 501 of the lower piece 152. The lower piece inclined surface 522 is connected to the lower piece blocking surface 524, and the lower piece blocking surface 524 is closer to the free end 512 than the lower piece inclined surface 522. Therefore, the lower piece fitting part 502 and the housing lower fitting part 302 of the housing 102 are the same in terms of shape. The lower piece fitting part 502 has a shape matching that of the housing lower fitting part 302, such that the lower piece fitting part 502 can receive the housing lower fitting part 302.

The lower piece 152 is further provided with a collecting cavity 504. The collecting cavity 504 is a recess located in the lower piece 152. In other words, the collecting cavity 504 is formed by recessing inward from an inner surface 501 of the lower piece 152. The collecting cavity 504 is configured to accommodate the cooling liquid leaking from the leakage passage lower port 212 of the leakage passage 208. When the collecting device 104 is mounted to the housing 102, the collecting cavity 504 can be aligned with the leakage passage lower port 212 to receive the cooling liquid leaked from the leakage passage lower port 212 of the leakage passage 208.

When the valve 100 is used in an internal combustion engine, the collecting cavity 504 can be further configured to accommodate the cooling liquid leaking from the leakage passage lower port 212 of the leakage passage 208 within a preset period of time. This is because the temperature in the internal combustion engine is relatively high, and the cooling liquid accommodated in the collecting cavity 504 will at least partially volatilize due to the high ambient temperature.

Figure 6A:
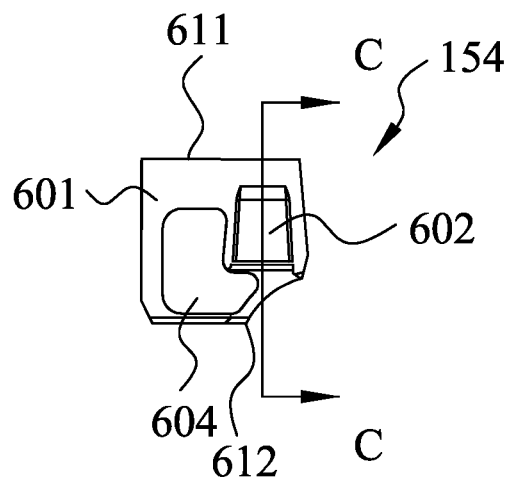
FIG. 6A is a side view of an upper piece shown in FIG. 4, as viewed from the inside to the outside.
Figure 6B:
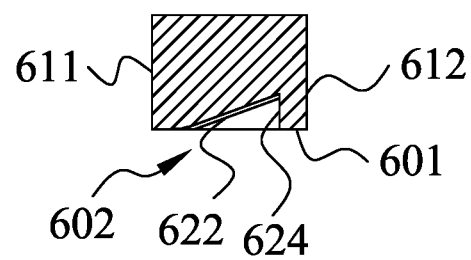
FIG. 6B is a cross-sectional view of the upper piece shown in FIG. 6A along line C-C in FIG. 6A.

FIG. 6A is a side view of the upper piece 154 shown in FIG. 4 as viewed from the inside to the outside. FIG. 6B is a cross-sectional view of the upper piece 154 shown in FIG.

6A along line C-C in FIG. 6A. As shown FIGS. 6A-6B, the upper piece 154 is substantially a block with a certain thickness. One end 611 thereof is connected to one end of the connector 156, and the other end thereof is a free end 612. The upper piece 154 is provided with an upper piece fitting part 602. The upper piece fitting part 602 is a recess located in the upper piece 154. In other words, the upper piece fitting part 602 is formed by recessing inward from an inner surface 601 of the upper piece 154. The upper piece fitting part 602 is wedge-shaped. That is, the cross section of the lower piece fitting part 602 in a lengthwise direction of the connector 156 (i.e., the cross section along line C-C of FIG. 6A) is triangular, and can match the housing upper fitting part 304. More specifically, the upper piece fitting part 602 has an upper component blocking surface 624 and an upper component inclined surface 622. The upper component blocking surface 624 is substantially perpendicular to the inner surface 601 of the upper piece 154. The upper component inclined surface 622 is connected to the upper component blocking surface 624, and the upper component blocking surface 624 is closer to the free end 612 than the upper component inclined surface 622. Therefore, the upper piece fitting part 602 and the housing upper fitting part 304 of the housing 102 are the same in terms of shape. The upper piece fitting part 602 has a shape matching that of the housing upper fitting part 304, such that the upper piece fitting part 602 can receive the housing upper fitting part 304.

In addition, the upper piece 154 is also provided with an additional cavity 604. The additional cavity 604 is formed in a way similar to the collecting cavity 504, which will not be repeated here. The upper piece 154 is configured such that when the collecting device 104 is mounted to the housing 102, the upper piece 154 can be aligned with the leakage passage upper port 214, such that the upper piece 154 can cover the leakage passage upper port 214, so as to prevent dust, etc. in the air from entering the housing cavity through the leakage passage 208.

Although in the embodiments of the present disclosure, the upper piece 154 is provided with the additional cavity 604, those skilled in the art could have understood that the upper piece 154 may not be provided with the additional cavity 604, and the inner surface 601 of the upper piece 154 can also cover the leakage passage upper end port 214.

Figure 7A:
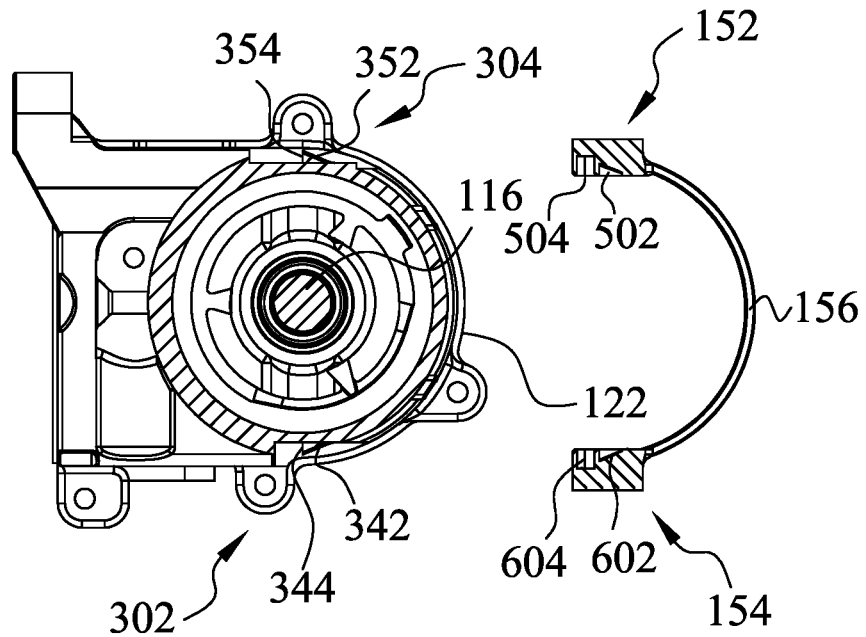
FIGS. 7A-7C are schematic diagrams of a process in which the collecting device shown in FIG. 1A is mounted to the housing.
Figure 7B:
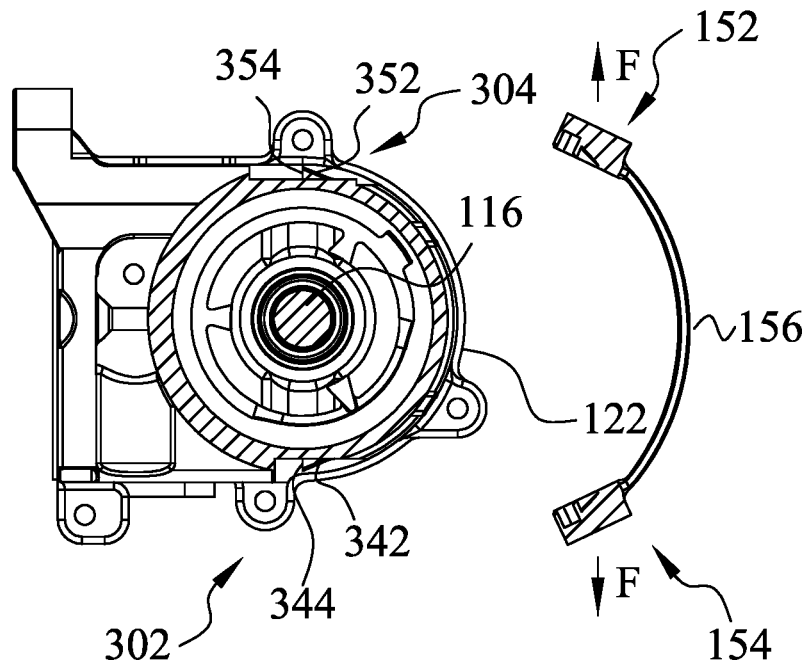
Figure 7C:
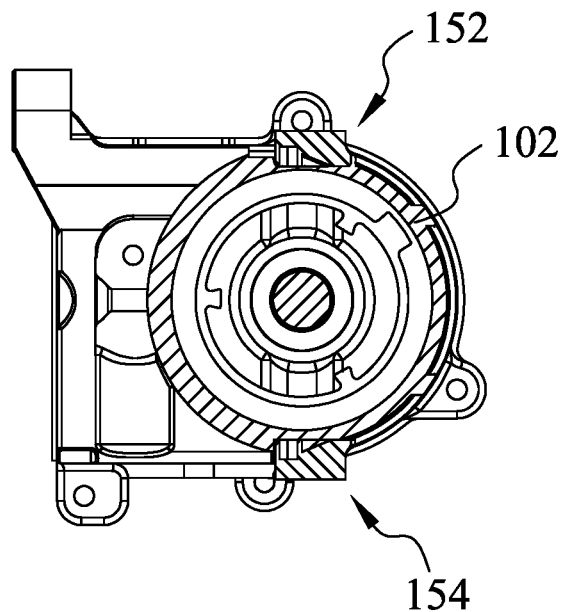

FIGS. 7A-7C are schematic diagrams of a process in which the collecting device 104 shown in FIG. 1A is mounted to the housing 102. FIG. 7A shows the relative position of the collecting device 104 when not mounted to the housing 102. FIG. 7B shows the state of the collecting device 104 when ready to be mounted to the housing 102. FIG. 7C shows the relative position of the collecting device 104 when mounted to the housing 102. Specifically, as shown in FIG. 7A, when the collecting device 104 needs to be mounted to the housing 102, the collecting device 104 needs to be close to and mounted to the housing 102, and the connector 156 of the collecting device 104 is aligned with the connector receiving part 360 on the housing 102. As shown in FIG. 7B, an operator respectively applies upward and downward external forces F to the upper piece 154 and the lower piece 152 of the collecting device 104, such that the collecting device 104 (especially the connector 156) deforms. The lower piece 152 and the upper piece 154 of the deformed collecting device 104 move away from each other. In more detail, the distance between the lower piece fitting part 502 and the upper piece fitting part 602 in the deformed collecting device 104 in the lengthwise direction of the collecting device 104 (i.e., the length of a curve in the lengthwise direction) is greater than that between the housing lower fitting part 302 and the housing upper fitting part 304 on the housing 102 in the circumferential direction (i.e., the length in the circumferential direction). In this case, as shown in FIG. 7C, the operator can connect the lower piece fitting part 502 with the housing lower fitting part 302, connect the upper piece fitting part 602 with the housing upper fitting part 304, and connect the connector 156 with the connection receiving part 360 on the housing 102, such that the collecting device 104 is fitted in place on the housing 102. Finally, the operator removes the force applied to the collecting device 104, and the collecting device 104 can be kept mounted on the housing 102.

When the collecting device 104 is kept mounted on the housing 102, the upper piece 154 may be supported by the housing 102. The connector 156 can apply an upward force to the lower piece 152, so as to overcome the gravity of the lower piece 152 and keep the lower piece 152 in place. The connector 156 is accommodated in the connection receiving part 360, and the left-right movement thereof is restricted by the left limiter 312 and the right limiter 314. After the collecting device 104 is fitted in place on the housing 102, the collecting device 104 is not easily escaped from the housing 102 due to external factors such as vibration.

Figure 8:
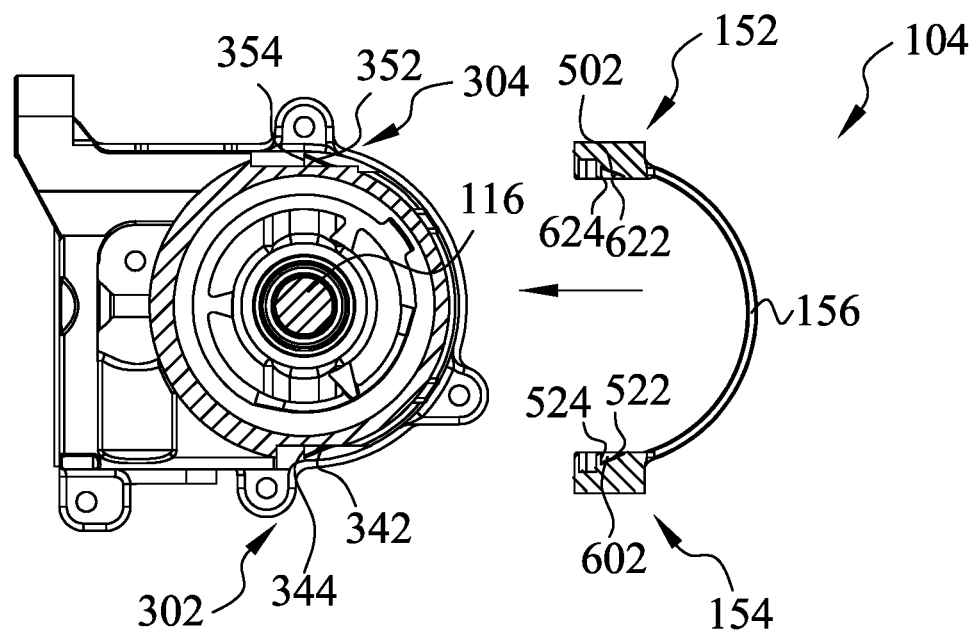
FIG. 8 is a schematic diagram of another process in which the collecting device shown in FIG. 1A is mounted to the housing.

FIG. 8 is a schematic diagram of another process in which the collecting device 104 is mounted to the housing 102. As shown in FIG. 8, instead of applying upward and downward external forces to the collecting device 104, the operator may press the collecting device 104 toward the housing 102. For example, the collecting device 104 moves in the direction of arrow shown in FIG. 8. The collecting device 104 is generally arc-shaped, such that when the upper piece 154 and the lower piece 152 of the collecting device 104 come into contact with the housing 102, the upper piece 154 and the lower piece 152 will respectively come into contact with the housing upper fitting part 304 and the housing lower fitting part 302. Because the housing upper fitting part 304 and the housing lower fitting part 302 respectively have the first inclined surface 342 and the second inclined surface 352, the first inclined surface 342 and the second inclined surface 352 respectively guide the lower piece 152 and the upper piece 154, such that the lower piece 152 and the upper piece 154 open outward (that is, the lower piece 152 and the upper piece 154 are away from each other). When the lower piece blocking surface 524 and the upper piece inclined surface 622 in the lower piece 152 and the upper piece 154 respectively pass across the first blocking surface 344 and the second blocking surface 354, the first inclined surface 342 and the second inclined surface 352 no longer apply outward expansion force to the collecting device 104. In this case, the lower piece fitting part 502 engages with the housing lower fitting part 302, the upper piece fitting part 602 engages with the housing upper fitting part 304, and the connector 156 is accommodated in the connector receiving part 360 on the housing 102. The collecting device 104 is fitted on the housing 102 in place. Such an operation method is simple, the mounting process comprises only one step, and the operator can complete the operation with one hand, which greatly improves the efficiency of mounting the collecting device 104 to the housing 102.

It should be noted that although in the present disclosure, the housing upper fitting part 304 and the housing lower fitting part 302 are symmetrically disposed with respect to a lengthwise direction of the housing body 122 (i.e., the axis of the housing body 122). However, the housing upper fitting part 304 and the housing lower fitting part 302 may not be disposed symmetrically with respect to the lengthwise direction of the housing body 122 (i.e., the axis of the housing body 122), as long as the housing upper fitting part 304 and the housing lower fitting part 302 are disposed in the same circumferential direction and can cover the leakage passage upper port and the leakage passage lower port.

It should also be noted that in the present disclosure the housing lower fitting part 302 and the lower piece fitting part 502 are referred to as a lower fitting assembly, and the housing upper fitting part 304 and the upper piece fitting part 602 are referred to as an upper fitting assembly. The lower piece 152 and the upper piece 154 can be mounted in place on the housing body 122 by means of the lower fitting assembly, the upper fitting assembly and the connector 156.

Although in the present disclosure both the components in the upper fitting assembly and the lower fitting assembly are wedge-shaped, those skilled in the art could have understood that the components in the upper fitting assembly and the lower fitting assembly can be of any shape.

Although in the present disclosure the housing upper fitting part 304 and the housing lower fitting part 302 protrude out of the housing body 122, and both the lower piece fitting part 502 and the upper piece fitting part 602 are recessed, those skilled in the art could have understood that both the housing upper fitting part 304 and the housing lower fitting part 302 may also be recessed, and the lower piece fitting part 502 and the upper piece fitting part 602 may protrude out of the housing body 122, as long as the housing lower fitting part 302 and the lower piece fitting part 502 in the lower fitting assembly can match each other and the housing upper fitting part 304 and the upper piece fitting part 602 in the upper fitting assembly can match each other.

The cooling liquid leaking from a valve 100 provided in the present disclosure can be collected by a collecting device 104 and will not drip out of the valve 100. In addition, the collecting device 104 provided in the present disclosure can be made by means of molding, is simple and easy to manufacture, and can save on the manufacturing time. The collecting device 104 can be mounted to the housing 102 by the collecting device 104 itself and the structure on the housing 102 without requiring additional fastening components (such as nuts and bolts), which can reduce the number of fitting components and save on costs.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present disclosure.

We claim:

1. A valve, comprising:
    a housing body, the housing body defining a housing cavity, the housing cavity extending transversely through the housing body;
    a partition plate, provided in the housing cavity to divide the housing cavity into a left cavity and a right cavity, a leakage passage being provided in and extends along the partition plate through the housing body, with a leakage passage lower port and a leakage passage upper port formed on the housing body; and
    a collecting device, the collecting device comprising a lower piece, an upper piece and a connector connecting the lower piece and the upper piece, wherein the upper piece is configured to cover the leakage passage upper port and the lower piece is configured to cover the leakage passage lower port, and wherein the lower piece comprises a collecting cavity communicating with the leakage passage lower port,
    wherein the lower piece and a lower part of the housing body are provided with a lower fitting assembly, the upper piece and an upper part of the housing body are provided with an upper fitting assembly, and the lower piece and the upper piece are fitted on the housing body in place by means of the lower fitting assembly, the upper fitting assembly, and the connector.

2. The valve according to claim 1, wherein the lower fitting assembly comprises a housing lower fitting part provided on the housing body and a lower piece fitting part provided on the lower piece, and wherein the upper fitting assembly comprises a housing upper fitting part provided on the housing body and an upper piece fitting part provided on the upper piece.

3. The valve according to claim 2, wherein the housing lower fitting part and the housing upper fitting part are disposed symmetrically with respect to an axis of the housing body.

4. The valve according to claim 2,
    wherein the housing lower fitting part and the housing upper fitting part protrude out of an outer surface of the housing body, and wherein the lower piece fitting part is a recess in the lower piece and the upper piece fitting part is a recess in the upper piece.

5. The valve according to claim 4,
    wherein the housing lower fitting part and the housing upper fitting part are respectively wedge-shaped,
    wherein the wedge-shaped housing lower fitting part comprises a first blocking surface and a first inclined surface connected with the first blocking surface, the first inclined surface being closer to the connector than the first blocking surface, and
    wherein the wedge-shaped housing lower fitting part comprises a second blocking surface and a second inclined surface connected with the second blocking surface, the second inclined surface being closer to the connector than the second blocking surface.

6. The valve according to claim 1,
    wherein the housing body further comprises a left limiter and a right limiter, wherein the left limiter and the right limiter respectively protrude out of an outer surface of the housing body, so that a connector receiving part is formed between the left limiter and the right limiter to receive the connector.

7. The valve according to claim 1,
    wherein the collecting device is made in one piece from plastic.

8. The valve according to claim 1,
    wherein the partition plate is provided with a shaft accommodating hole transversely penetrating through the partition plate and used for accommodating a shaft, and wherein the shaft accommodating hole is in communication with the leakage passage.

9. The valve according to claim 8,
    wherein the housing body further comprises a left sealing plate and a right sealing plate, the left sealing plate and the right sealing plate are connected with left and right surfaces of the partition plate around the shaft accommodating hole, respectively, and wherein the valve further comprises:
    the shaft, the shaft being disposed through the shaft accommodating hole;
    a first seal, the first seal being annular, wherein an inner wall of the first seal abuts against the shaft and an outer wall of the first seal abuts against the left sealing plate such that the left cavity and the leakage passage are sealed from each other by the first seal; and a second seal, the second seal being annular, wherein an inner wall of the second seal abuts against the shaft and an outer wall of the second seal abuts against the right sealing plate such that the leakage passage and the right cavity are sealed from each other by the second seal.

10. The valve according to claim 1, wherein the left cavity is used for accommodating a driving component, and the right cavity is used for accommodating a valve body of the valve.

\* \* \* \* \*